United States Patent [19]

Fennema et al.

[11] Patent Number: 5,060,210
[45] Date of Patent: Oct. 22, 1991

[54] CONTROLLING HEAD SEEKING SPEED IN DISK STORAGE UNITS BY LIMITING DISPLACEMENT OF HEAD WITH RESPECT TO ITS SUPPORTING HEADARM

[75] Inventors: Alan A. Fennema; Reed A. Hancock, both of Tucson, Ariz.

[73] Assignee: International Business Machines Corporation, Armonk, N.Y.

[21] Appl. No.: 589,706

[22] Filed: Sep. 28, 1990

[51] Int. Cl.⁵ ............................................. G11B 7/00
[52] U.S. Cl. .................................. 369/32; 369/124; 369/44.34; 360/78.05
[58] Field of Search .................... 369/32, 44.29, 44.35, 369/44.25, 44.26, 33, 43, 48, 124, 44.28, 44.32, 44.36; 360/77.03, 77.06, 77.07, 77.08, 78.05; 358/342; 318/560

[56] References Cited

U.S. PATENT DOCUMENTS

| | | | |
|---|---|---|---|
| 4,627,039 | 12/1986 | Meyer | 369/44 |
| 4,736,353 | 5/1988 | Kasai et al. | 369/32 |
| 4,839,876 | 6/1989 | Fennema | 369/32 |
| 4,914,725 | 4/1990 | Belser et al. | 360/77.06 |

Primary Examiner—Roy N. Envall, Jr.
Assistant Examiner—Thang V. Tran
Attorney, Agent, or Firm—H. F. Somermeyer

[57] ABSTRACT

In a "piggy-back" head support system, a fine actuator which carries the head (lens or transducer) is controlled to move the head. A coarse actuator or headarm movably supports the fine actuator and is mounted on a frame for movement radially of the signal storage disk. The head scans tracks on the disk. A servo actuates the coarse actuator to follow the movements of the fine actuator. In a seek, the fine coarse actuator may not be able to follow the fine actuator resulting in the fine actuator hitting a safety stop. When this happens, seek errors occur. According to the invention, the relative displacement of the fine actuator with respect to the coarse actuator is limited during predetermined portions of a seek operation, i.e., the high speed accelerate and decelerate portions.

10 Claims, 1 Drawing Sheet

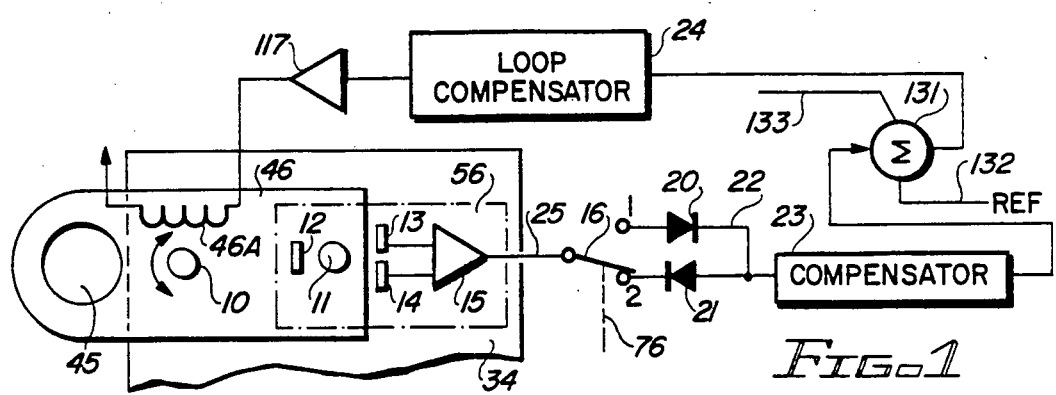
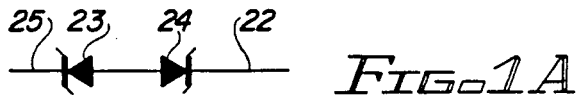
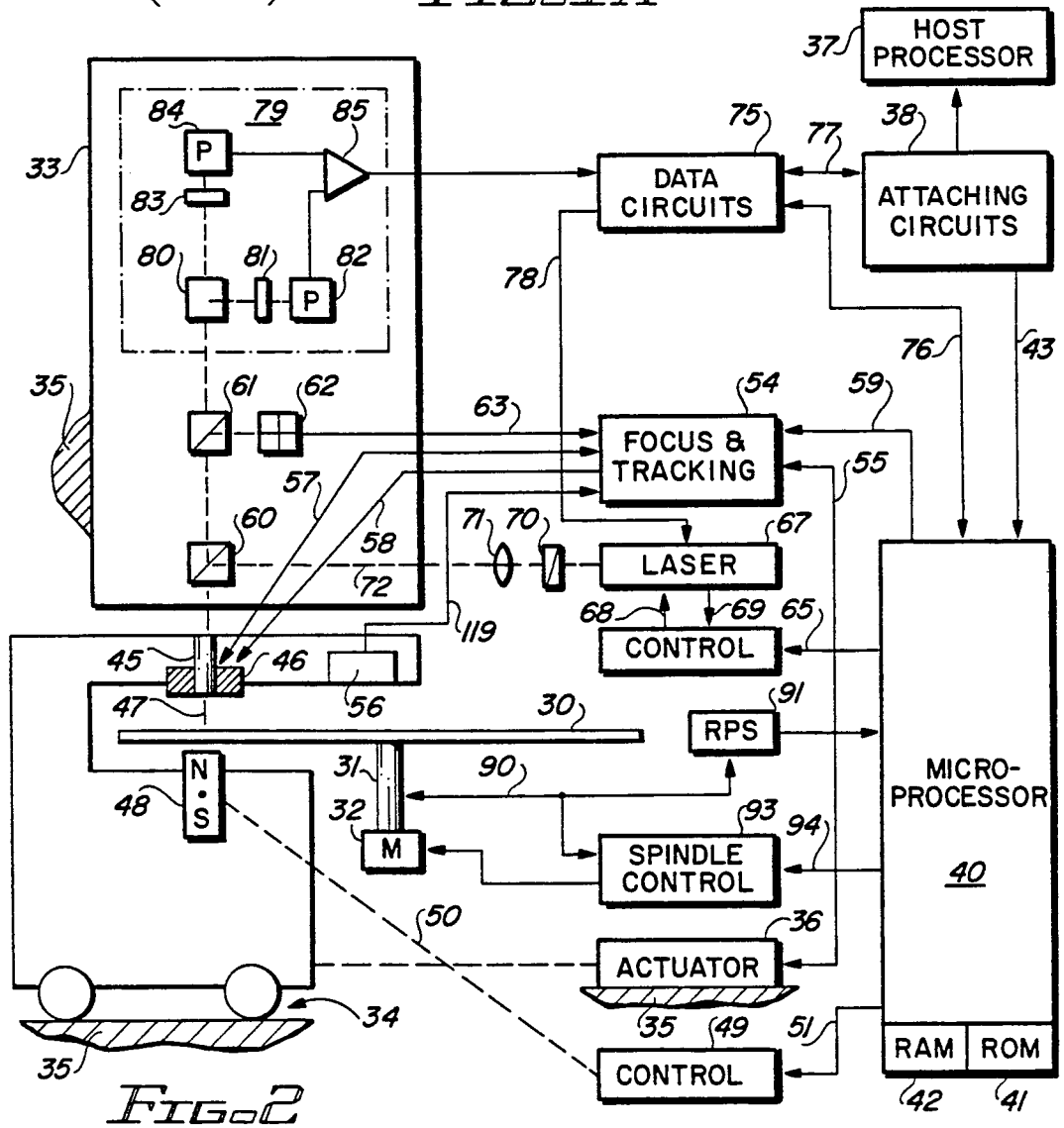

CONTROLLING HEAD SEEKING SPEED IN DISK STORAGE UNITS BY LIMITING DISPLACEMENT OF HEAD WITH RESPECT TO ITS SUPPORTING HEADARM

DOCUMENTS INCORPORATED BY REFERENCE

U.S. Pat. Nos. 4,914,725 and 4,839,876 are incorporated by reference for showing applications of the present invention in optical disk recorders.

FIELD OF THE INVENTION

The present invention relates to servo-positioning systems and more particular to those servo-positioning systems usable in disk recorders.

BACKGROUND OF THE INVENTION

So-called "piggy-back" transducer mounts have been used both in magnetic and optical disk drives. In such "piggy-back" arrangements, the transducer or lens has its position controlled using a so-called fine actuator. The fine actuator is moveably mounted on a coarse actuator also termed a carriage or headarm. In a preferred arrangement, a servo circuit controls the fine actuator to position the transducer or lens with respect to a record member based upon the position error of the lens or transducer and the desired position with respect to the record member. Either position or velocity profiles may be used in this control. A separate servo circuit controls the coarse actuator to always follow the motions of the fine actuator. A so-called relative position error (RPE) sensor mounted on the coarse actuator measures and indicates the relative displacement of the fine actuator with respect to a reference position on the coarse actuator. The RPE indication is supplied to the servo for the coarse actuator for causing the coarse actuator to follow the motions of the fine actuator. Typically, the responsiveness of the fine actuator is much greater than that of the coarse actuator. This in part is caused by the lower mass of the fine actuator with respect to the mass of the coarse actuator.

During so-called track following operations, the fine actuator follows the desired record track, either magnetic or optical using only minor motions of the fine actuator. During such track following, the coarse actuator generally does not move. During a seek operation wherein the transducer or lens is moved from a current track to a target or desired track, the fine actuator can lead the coarse actuator such that the fine actuator may engage a mechanical stop on the coarse actuator. At this point in time, a seek error can occur resulting in a decreased probability that a target track will be immediately accessed. It is desired to provide controls for ensuring a most rapid seek operation while ensuring that the fine actuator is maintained within a predetermined range of displacements with respect to the coarse actuator.

DISCUSSION OF THE PRIOR ART

U.S. Pat. No. 4,736,353 shows that during a seek operation, a fine actuator is locked in the position it happens to be when the seek was initiated. All motions of the seek are performed by the coarse actuator. This arrangement does prevent seek errors in that the fine actuator relative position is maintained. Unfortunately, the seek time is increased. It is desired to provide a control of a fine actuator that enables it to be controlled during a seek operation rather than locked to the coarse actuator for optimizing seek performance operations.

Belser, et al. U.S. Pat. No. 4,914,725 shows an RPE detector which detects the relative position between a fine and a coarse actuator. The relative position indication is supplied to a track following circuit to provide an offset in that operation. There is no showing nor suggestion of how such an RPE can be used for a seek operation. Belser, et al. also shows the "piggy-back" arrangement referred to in the background of the invention. Belser, et al. show a separate velocity seek loop and a separate position track following loop. U.S. Pat. No. 4,839,876 Fennema shows a single loop for both seeking and track following.

SUMMARY OF THE INVENTION

In accordance with the present invention, in a "piggy-back" head or lens support system wherein a fine actuator is moveably carried on a coarse actuator (carriage or headarm) which in turn is moveably supported on a frame, both emotions are transverse to the longitudinal extent of tracks on a record member to be scanned by the head or lens. In a disk device, the transverse direction is radial of the disk. In a seek operation wherein the coarse actuator is slave to and follows the motions of the fine actuator, the relative position of the fine actuator to the coarse actuator is limited by changing the servo drive to the fine actuator. The relative position error (RPE) is supplied to the servo circuit which controls the fine actuator. When the relative position error between the fine and coarse actuator exceeds the predetermined threshold then the drive signal amplitude to the fine actuator is limited. A signal threshold is provided such that the relative position error is not continuously fed to the fine actuator servo loop. The threshold is preferably provided by a pair of oppositely poled diodes which are selectively switched to be connected to the servo circuit respectively for radially in and radially out seek motions. Oppositely poled Zener diodes can be used in either a parallel or serial connection.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 1 is a simplified schematic diagram which illustrates the practice of the present invention.

FIG. 1A is an abbreviated circuit diagram showing a second diode-provided threshold arrangement for use in the FIG. 1 circuits.

FIG. 2 is a simplified block-schematic diagram of an optical disk recorder in which the present invention is advantageously employed.

DETAILED DESCRIPTION OF THE DRAWINGS

Referring now more particularly to the appended drawing, like numerals indicate like parts and structural features in the figures. A coarse actuator 36 (FIG. 2) moves a head carriage or arm 34 radially of disk 30. Mounted on carriage 34 is a rotary fine actuator 46 mounted for rotation about pivot pin 10 which is secured to carriage 34. Lens 45 is suitably mounted on one distal end of fine actuator 46. The relative position of fine actuator 46 with respect to coarse actuator or carriage 34 is indicated by a flag 11 securely mounted on fine actuator 46. A light source 12 suitably secured to and moveable with carriage 34 emits light toward flag 11. As fine actuator 46 rotates about pivot pin 10, the light transmitted past flag 11 varies. A pair of photo detector diodes 13 and 14 are mounted on carriage 34 opposite light emitting diode or light source 12 such that as fine actuator 46 rotates, the light impinging on the diodes 13 and 14 varies for indicating the relative rotational position of fine actuator 46 with respect to a desired reference position on carriage 34. The reference position is indicated by an equal impinging light upon photo diodes 13 and 14. Photo diodes 13 and 14 supply their respective electrical signals to opposite inputs of differential amplifier 15 which in turn supplies an RPE signal to switch 16. Elements 11 through 15 constitute RPE detector 56. Line 76 from microprocessor 40 actuates switch 16 between the first and second positions respectively for including diodes 20 or 21 in the circuit for supplying the RPE signal over line 22 via lead compensator 23 to current summer 131. The current summer 131 receives the reference signal over line 132 and a position or velocity error signal over line 133. The RPE signal on line 22 has a signal polarity opposite to the signal polarity on line 133 for reducing the amplitude of the signal supplied from summer 131 through the FIG. 2 illustrated circuit elements via loop compensator 24 to power amplifier 117. The power amplifier 117 in turn supplies the fine actuator 46 rotating current to actuating coil 46A mounted thereon. Magnets (not shown) are mounted in the headarm 34 along side the fine actuator 46 in a spaced relationship. The spacing between the magnets (not shown) and the fine actuator 46 limit the rotation thereof.

Microprocessor 40 in actuating switch 16 requires a seek operation in a predetermined direction for a radially inward motion for example, switch 16 is actuated to the illustrated position wherein diode 21 is connected in the circuit. For a radially outward motion, diode 20 is connected in the circuit by switch 16 moving to the first terminal. Switch 16 may have an intermediate position wherein neither terminals 1 or 2 are connected to RPE circuit 56. When switch 16 is connected to terminal then the RPE signal is always relatively negative, i.e., direction of that fine actuator 46 with respect to carriage 34 in such a direction that photodetector 14 always provides a greater signal amplitude than photo detector 13. Diode 21 does not forward conduct until a given threshold of difference in relative position is signaled whereupon diode 21 conducts rapidly for providing immediate and significant limitation on the drive signal supplied to coil 46A. When the seek is in the opposite direction and switch 16 is connected to terminal 2 then the RPE signal is mostly generated by diode 13 resulting in a relative positive signal being supplied to diode 20. Diode 20 will not be conductive in the forward direction to line 22 until its forward current conduction threshold is exceeded. In this arrangement, an RPE error threshold is established in both directions of relative motion. A further threshold is provided by microprocessor 40 moving switch 16 to a disconnected position intermediate terminals 1 and 2 wherein both the Zener diodes 20 and 21 are out of the circuit.

Switch 16 may be dispensed with. Terminals 1 and 2 can be ohmically connected together and to line 25. Operation is as above described but without the switch 16 control. Diodes 20 and 21 may be Zener diodes.

Based on the above it is seen the RPE signal from differential amplifier 15 moderates the acceleration and deceleration of the fine tracking servo in actuating coil 46A when the fine actuator 46 approaches its limits of travel as indicated by the thresholds discussed above, acceleration is controlled by feedback from the tracking error over line 133 and the RPE error on line 22. As a word of caution, if the RPE signal was always supplied over line 22, then for a single loop servo as shown in U.S. Pat. No. 4,839,876 would result in interference with faithful track following and optimum target track capture. The diodes 20 and 21, or their functional equivalent block the RPE signal from reaching line 22 except when the value of the RPE signal amplitude exceeds the current conduction thresholds of the diodes. Electrical bias circuits may be used to change the effective conduction thresholds. Any asymmetrically conduction circuit (non-linear) may be used in place of diodes 20 and 21. As the coarse actuator 36 causes carriage 34 to lag behind the fine actuator 46 position, the weighting given to the RPE increases dramatically moderating the acceleration so the coarse actuator can move the carriage 34 for preventing the fine actuator 46 from engaging the magnets discussed above. The worst situation occurs during the deceleration phase of the seek operation. As a result, a maximal seek performance is achieved within the limits of the circuits and physical parameters of the disk drive. While maintaining good reliability and track following performance, the usual compensation networks may be included such as shown in the documents incorporated by reference.

FIG. 1A shows a pair of serially-connected in opposing polarity Zener diodes 23 and 24 disposed between lines 22 and 25 of FIG. 1. The thresholds of the Zener diodes provide the thresholds mentioned above. In addition to the Zeners per se, biasing circuits may be provided for altering the thresholds, as is known.

The environment in which the present invention is advantageously practiced is shown in FIG. 2. A magnetooptic record disk 30 is mounted for rotation on spindle 31 by motor 32. Optical portion 33 is mounted on frame 35. A headarm carriage 34 moves radially of disk 30 for carrying an objective lens 45 from track to track. A frame 35 of recorder suitably mounts carriage 34 for reciprocating radial motions. The radial motions of carriage 34 enable access to any one of a plurality of concentric tracks or circumventions of a spiral track for recording and recovering data on and from the disk. Linear actuator 36 suitably mounted on frame 35, radially moves carriage 34 for enabling track accessing. The recorder is suitably attached to one or more host processors 37, such host processors may be control units, personal computers, large system computers, communication systems, image signal processors, and the like. Attaching circuits 38 provide the logical and electrical connections between the optical recorder and the attaching host processors 37.

Microprocessor 40 controls the recorder including the attachment to the host processor 37. Control data, status data, commands and the like are exchanged between attaching circuits 38 and microprocessor 40 via bidirectional bus 43. Included in microprocessor 40 is a program or microcode-storing, read-only memory (ROM) 41 and a data and control signal storing random-access memory (RAM) 42.

The optics of the recorder include an objective or focusing lens 45 mounted for focusing and radial tracking motions on headarm 33 by fine actuator 46. This actuator includes mechanisms for moving lens 45 toward and away from disk 30 for focusing and for radial movements parallel to carriage 34 motions; for example, for changing tracks within a range of 100 tracks so that carriage 34 need not be actuated each time a track adjacent to a track currently being accessed is to be accessed. Numeral 47 denotes a two-way light path between lens 45 and disk 30.

In magnetooptic recording, magnet 48 in a constructed embodiment (magnet 48 is an electromagnet) provides a weak magnetic steering field for directing the remnant magnetization direction of a small spot on disk 30 illuminated by laser light from lens 45. The laser light spot heats the illuminated spot on the record disk to a temperature above the Curie point of the magnetooptic layer (not shown, but can be an alloy of rare earth and transitional metals as taught by Chaudhari et al., U.S. Pat. No. 3,949,387). This heating enables magnet 48 to direct the remnant magnetization to a desired direction of magnetization as the spot cools below the Curie point temperature. Magnet 48 is shown as oriented in the "write" direction, i.e., binary ones recorded on disk 30 normally are "north pole remnant magnetization". To erase disk 30, magnet 48 rotates so the south pole is adjacent disk 30. Magnet 48 control 49, which is operatively coupled to rotatable magnet 48 as indicated by dashed line 50, controls the write and erase directions. Microprocessor 40 supplies control signals over line 51 to control 49 for effecting reversal of the recording direction.

It is necessary to control the radial position of the beam following path 47 such that a track or circumvolution is faithfully followed and that a desired track or circumvolution is quickly and precisely accessed. To this end, focus and tracking circuits 54 control both the coarse actuator 36 and fine actuator 46. The positioning of carriage 34 by actuator 36 is precisely controlled by control signals supplied by circuits 54 over line 55 to actuator 36. Additionally, the fine actuator 46 control by circuits 54 is exercised through control signals travelling to fine actuator 46 over lines 57 and 58, respectively for effecting respective focus and track following and seeking actions. Sensor 56 senses the relative position of fine actuator 46 to headarm carriage 33 to create a relative position error (RPE) signal. Line 57 consists of two signal conductors, one conductor for carrying a focus error signal to circuits 54 and a second conductor for carrying a focus control signal from circuits 54 to the focus mechanisms in fine actuator 46.

The focus and tracking position sensing is achieved by analyzing laser light reflected from disk 30 over path 47, thence through lens 45, through one-half mirror 60 and to be reflected by half-mirror 61 to a so-called "quad detector" 62. Quad detector 62 has four photoelements which respectively supply signals on four lines collectively denominated by numeral 63 to focus and tracking circuits 54. Aligning one axis of the detector 62 with a track center line, track following operations are enabled. Focusing operations are achieved by comparing the light intensities detected by the four photoelements in the quad detector 62. Focus and tracking circuits 54 analyze the signals on lines 63 to control both focus and tracking.

Recording or writing data onto disk 30 is next described. It is assumed that magnet 48 is rotated to the desired position for recording data. Microprocessor 40 supplies a control signal over line 65 to laser control 66 for indicating that a recording operation is to ensue. This means that laser 67 is energized by control 66 to emit a high-intensity laser light beam for recording; in contrast, for reading, the laser 67 emitted laser light beam is a reduced intensity for not heating the laser illuminated spot on disk 30 above the Curie point. Control 66 supplies its control signal over line 68 to laser 67 and receives a feedback signal over line 69 indicating the laser 67 emitted light intensity. Control 68 adjusts the light intensity to the desired value. Laser 67, a semiconductor laser, such as a gallium-arsenide diode laser, can be modulated by data signals so the emitted light beam represents the data to be recorded by intensity modulation. In this regard, data circuits 75 (later described) supply data indicating signals over line 78 to laser 67 for effecting such modulation. This modulated light beam passes through polarizer 70 (linearly polarizing the beam), thence through collimating lens 71 toward half mirror 60 for being reflected toward disk 30 through lens 45. Data circuits 75 are prepared for recording by the microprocessor 40 supplying suitable control signals over line 76. Microprocessor 40 in preparing circuits 75 is responding to commands for recording received from a host processor 37 via attaching circuits 38. Once data circuits 75 are prepared, data is transferred directly between host processor 37 and data circuits 75 through attaching circuits 38. Data circuits 75, also ancillary circuits (not shown), relating to disk 30 format signals, error detection and correction and the like. Circuits 75, during a read or recovery action, strip the ancillary signals from the readback signals before supply corrected data signals over bus 77 to host processor 37 via attaching to 38.

Reading or recovering data from disk 30 for transmission to a host processor requires optical and electrical processing of the laser light beam from the disk 30. That portion of the reflected light (which has its linear polarization from polarizer 70 rotated by disk 30 recording using the Kerr effect) travels along the two-way light path 47, through lens 45 and half-mirrors 60 and 61 to the data detection portion 79 of the headarm 33 optics. Half-mirror or beam splitter 80 divides the reflected beam into two equal intensity beams both having the same reflected rotated linear polarization. The half-mirror 80 reflected light travels through a first polarizer 81 which is set to pass only that reflected light which was rotated when the remnant magnetization on disk 30 spot being accessed has a "north" or binary one indication. This passed light impinges on photocell 82 for supplying a suitable indicating signal to differential amplifier 85. When the reflected light was rotated by a "south" or erased pole direction remnant magnetization, then polarizer 81 passes no or very little light resulting in no active signal being supplied by photocell 82. The opposite operation occurs by polarizer 83 which passes only "south" rotated laser light beam to photocell 84. Photocell 84 supplies its signal indicating its received laser light to the second input of differential amplifier 85. The amplifier 85 supplies the resulting difference signal (data representing) to data circuits 75 for detection. The detected signals include not only data that is recorded but also all of the so-called ancillary signals as well. The term "data" as used herein is intended to include any and all information-bearing signals, preferably of the digital or discrete value type.

The rotational position and rotational speed of spindle 31 is sensed by a suitable tachometer or emitter sensor 90. Sensor 90, preferably of the optical-sensing type that senses dark and light spots on a tachometer wheel (not shown) of spindle 31, supplies the "tach" signals (digital signals) to RPS circuit 91 which detects the rotational position of spindle 31 and supplies rotational information-bearing signals to microprocessor 40. Microprocessor 40 employs such rotational signals for controlling access to data storing segments on disk 30 as is widely practiced in the magnetic data storing disks. Additionally, the sensor 90 signals also travel to spindle speed control circuits 93 for controlling motor 32 to rotate spindle 31 at a constant rotational speed. Control 93 may include a crystal-controlled oscillator for controlling motor 32 speed, as is well known. Microprocessor 40 supplies control signals over line 94 to control 93 in the usual manner.

While the invention has been particularly shown and described with reference to preferred embodiments thereof, it will be understood by those skilled in the art that various changes in form and details may be made therein without departing from the spirit and scope of the invention:

What is claimed is:

1. In a disk storage system having a fine actuator carrying a head and being movably supported by a coarse actuator, a frame mounting the coarse actuator and a record member for relative movements across record tracks of the record member at varying cross-track speeds of the fine actuator wherein there is a relative movement between the fine and coarse actuators resulting in a momentary displacement of the fine actuator from a desired reference position on the coarse actuator, the improvement including, in combination:

actuating means connected to the fine actuator for actuating the fine actuator for movements transverse to the tracks;

relative position error (RPE) sensing and indicating means mounted between the coarse and fine actuators for detecting and indicating the displacement of the fine actuator from said reference position as an RPE indication; and means electrically interposed between the RPE sensing and indicating means and the actuating means for responding to the RPE sensing and indicating means indication of the displacement of the fine actuator from said desired reference position for actuating the actuating means to reduce the speed of the fine actuator such that the displacement of the fine actuator is limited to a predetermined maximum displacement from said reference position.

2. In the system set forth in claim 1 further including, in combination:

said interposed means comprising a pair of oppositely poled semiconductor diodes.

3. In the system set forth in claim 2, wherein the diodes are connected in parallel to each other.

4. In the system set forth in claim 3 wherein the diodes are Zener diodes.

5. In the system set forth in claim 2 wherein the diodes are connected serially and are Zener diodes.

6. In the system set forth in claim 1, further including, in combination:

said RPE sensing and indicating means including a light source on the coarse actuator and a pair of photo sensors on the coarse actuator facing the light source;

an opaque flag member mounted on the fine actuator for movements therewith and being optically interposed between the light source and the photo sensors for changing the light impinging on the photosensors as the fine and coarse actuators relatively move; and a differential amplifier means having two inputs respectively connected to the photosensors and supplying an output signal as the indication of current displacement of the fine actuator from said reference position.

7. In the system set forth in claim 1, further including, in combination:

control means connected to the interposed means for actuating said interposed means during a predetermined portion of a seek operation; and said control means further having means for actuating the fine actuator to seek the head to a predetermined target track from a current track.

8. In the system set forth in claim 7, further including, in combination:

speed sensing means for sensing and supplying a speed indication of the cross-track speed of the fine actuator;

said control means having retard control means connected to said speed sensing means for responding to said cross-track speed indication indicating a predetermined or greater cross-track speed of the fine actuator crossing the tracks for indicating said predetermined portion of the seek operation such that the control means only actuates the interposed means only when the cross-track speed of the fine actuator is at or greater than said predetermined cross-track speed of the fine actuator.

9. In the system set forth in claim 1, further including, in combination:

said interposed means including threshold responsive devices for passing the RPE indication to the actuating means only when the RPE indication exceeds a predetermined amplitude.

10. In a method of operating a disk storage system including the steps:

mounting a transducer on a fine actuator, mounting the fine actuator on a carriage movably mounted with respect to a record member having elongated tracks for cross-track movements and wherein said fine actuator can accelerate and decelerate faster than said carriage, establishing a reference position for the transducer on the carriage, sensing for displacements of said transducer from said reference position, actuating the carriage to follow movements of the transducer for maintaining said transducer at said reference position;

moving the transducer from a current track toward a target track across other tracks between the current and target tracks at a maximal acceleration and then at a predetermined deceleration of said fine actuator for effecting a predetermined maximum cross-track speed of the transducer and actuating the carriage to follow the cross-track movements of the fine actuator;

sensing and indicating the cross-track speed of the transducer;

sensing and indicating the displacement of the transducer from said reference position;

providing a predetermined cross-track speed of said transducer crossing said other tracks and a predetermined maximum desired displacement of the fine actuator from said reference position; and detecting the sensed and indicated cross-track speed exceeding said predetermined cross-track speed and detecting the indicated displacement of the transducer from said reference position exceeding said predetermined desired maximum displacement and limiting the cross-track speed of the transducer to not exceed said predetermined cross-track speed nor said maximum displacement.

* * * * *